United States Patent [19]
Mosow

[11] 3,799,108
[45] Mar. 26, 1974

[54] STRAIN INDICATOR AND METHOD
[75] Inventor: Jack E. Mosow, Greensburg, Pa.
[73] Assignee: Modulus Corporation, Cleveland, Ohio
[22] Filed: Dec. 13, 1971
[21] Appl. No.: 207,260

[52] U.S. Cl. .............................. 116/114 R, 85/62
[51] Int. Cl. ............................................ G01d 21/00
[58] Field of Search...... 116/114, DIG. 34; 73/88 F, 73/88 E, 1, 85.5; 85/62; 340/373

[56] References Cited
UNITED STATES PATENTS

| | | | |
|---|---|---|---|
| 2,747,454 | 5/1956 | Bowersett | 85/62 |
| 2,866,186 | 12/1958 | Hardesty | 340/373 |
| 3,162,849 | 12/1964 | Cunnien | 340/373 |
| 3,224,316 | 12/1965 | Grikscheit et al. | 85/62 |
| 3,602,186 | 8/1971 | Popenoe | 73/88 F |

FOREIGN PATENTS OR APPLICATIONS
28,321 9/1931 Australia................ 116/70 UX Primary Examiner—Louis J. Capozi
Attorney, Agent, or Firm—Fay, Sharpe and Mulholland

[57] ABSTRACT

A strain indicator of the type wherein a change in length of a strain member produces a change in color of a visual indicator. An indicator area and a light-absorbing indicator fluid are encapsulated in a member that also includes a window. The capsule is fastened to the strain member with an adhesive. A change in length of the strain member causes the indicator area to become separated from the window with the result that light-absorbing indicator fluid is caused to flow between the indicator area and the window. The method of the invention comprises method steps of manufacturing subassemblies of the strain indicator as well as the method steps leading to complete assembly of the indicator.

13 Claims, 15 Drawing Figures

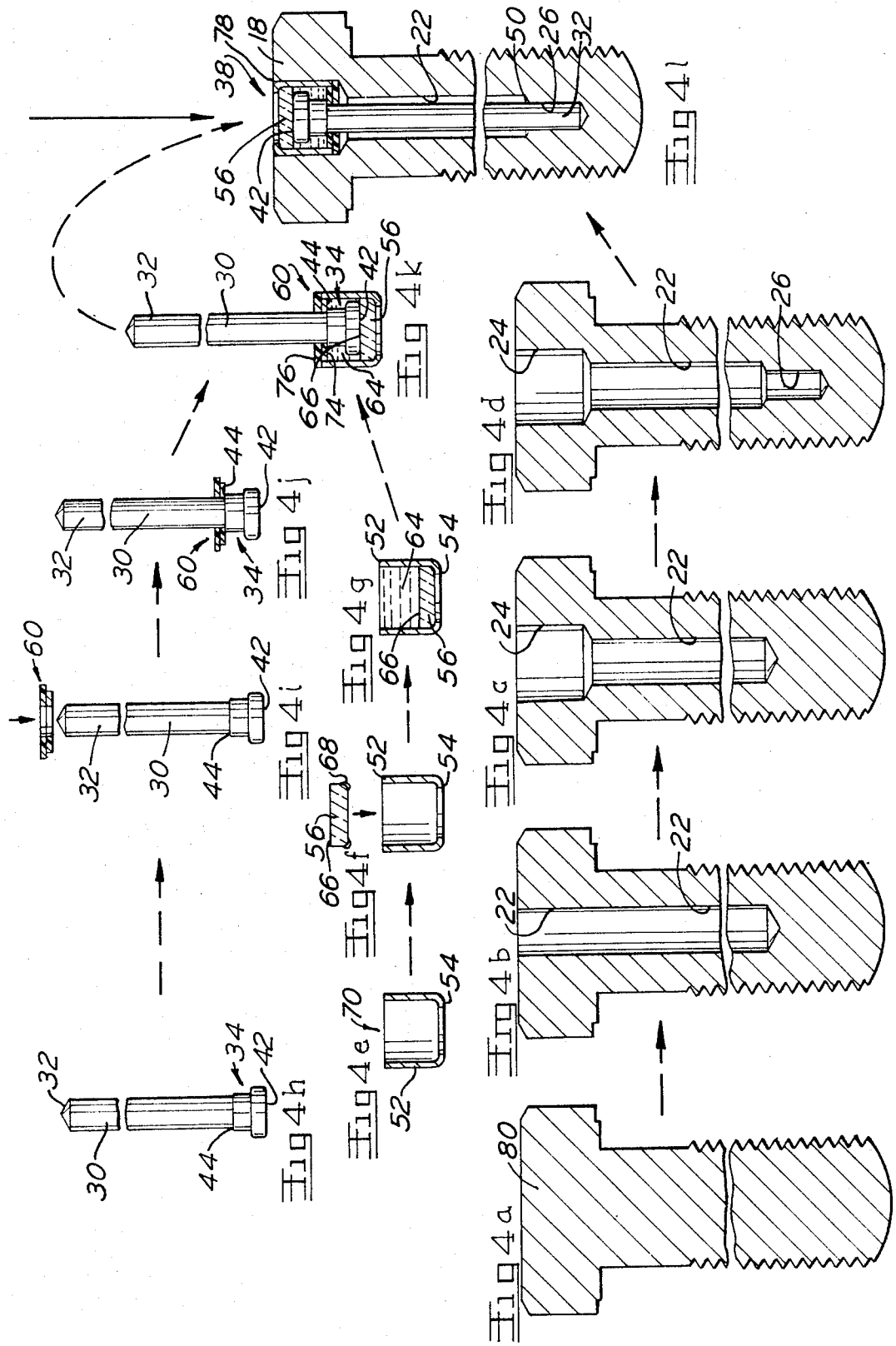

STRAIN INDICATOR AND METHOD

BACKGROUND OF THE INVENTION

This invention relates to strain indicators of the type shown in U.S. Pat. No. 3,602,186 to Charles H. Popenoe. More particularly, this invention relates to a strain indicator apparatus and a method of assembly of a strain indicator apparatus of the type wherein a change in length of a strain member produces a change in color of a visual indicator.

In many assembly operations where fastening devices are used it is desirable to inspect the assembled fastener to determine that it has been taken up an appropriate amount. The fastener may be, for example, a stud, a bolt, a rivet, or the like.

Several prior art techniques have been utilized for determining when a fastener has been properly taken up. One such technique involves the use of torque wrench in which a specific number of foot pounds may be verified as having been applied to a fastener in the assembly thereof. Other prior art techniques have made use of the fact that take up of a fastener will set up certain stress levels in the fastener which may be measured as, for instance, by means of stress sensitive material. Still further prior art techniques have made use of the fact that take up of a fastener produces an elongation of the fastener which may be measured utilizing well known techniques such as direct measuring devices.

The above examples demonstrate that fastener take up may be measured by determining either torque, stress or strain values in a fastener.

Since torque, stress and strain are all interrelated, it is possible to determine the stress levels in a fastener knowing the strain of the fastener. Similarly, it is possible to determine torque values knowing the stress imparted to the fastener at any point. Thus, for purposes of illustration, the terms torque, stress, and strain may be used interchangeably. The device of this invention is termed a strain indicator because the elongation of the fastener is being sensed in order to determine a fully made up condition of the fastener. The term strain indicator should not be considered as limiting since in its broadest sense the device of this invention may be considered a stress or torque indicator as well.

In U.S. Pat. No. 3,602,186 there is shown and described a strain indicator of the type wherein a change in length of the fastener causes an indicator area of a pin to separate from a window with the result that light-absorbing indicator fluid is caused to flow between the indicator area and the window. Certain shortcomings have been found in the design of the fastener shown in U.S. Pat. No. 3,602,186 principally related to problems encountered in the manufacture of the fastener.

These shortcomings, which will be described more fully hereafter, have led to the development of an improved strain indicator as well as the development of a method of assembly of an improved strain indicator.

SUMMARY OF THE INVENTION

Briefly summarized, the strain indicator of this invention comprises a threaded bolt having a bore extending from the bolt head into the body. A pin member is received within the bore. The inner end of the pin member is fixed to the fastener by means of an adhesive. The free end of the pin member is encapsulated in a fluid holding member which itself is attached to the fastener. The fluid holding member is comprised of a generally cylindrical ferrule member, a window, and a seal through which the pin member extends. A brightly colored indicator area is provided at the end of the pin and is adapted to be disposed adjacent the window of the capsule. The entire capsule is filled with a light-absorbing indicator fluid. As the length of the threaded fastener is changed, the indicator area separates from the window with the result that light-absorbing indicator fluid is caused to flow between the indicator area and the window. The fluid absorbs the color of the indicator area giving a visual indication that proper take up of the bolt has been accomplished.

The method of this invention broadly encompasses the manufacturing steps of:

a. providing a threaded bolt subassembly;

b. providing an indicator subassembly which includes a pin member having an encapsulated indicator area and a window disposed adjacent the indicator area; and c. fastening the indicator subassembly to the fastener subassembly.

BRIEF DESCRIPTION OF THE DRAWINGS

A more complete description of the invention will now be made with reference to the accompanying drawings in which:

FIG. 4($a$) – 4($l$) are elevational and cross-sectional views showing the various elements of the apparatus of this invention during assembly utilizing the method steps of this invention.

ANALYSIS OF PRIOR ART FASTENER

Figure 3:
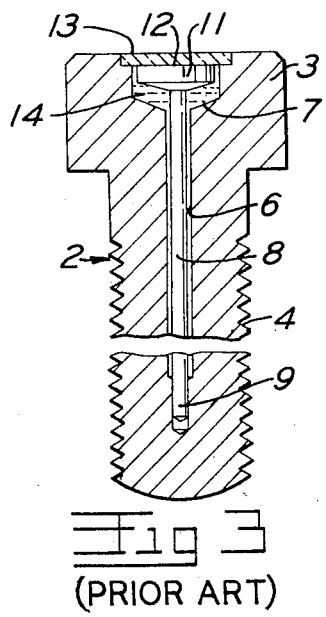
FIG. 3 is an elevational cross-sectional view of a prior art fastener.

Before proceeding with a detailed description of the preferred embodiment of the apparatus of this invention, reference will initially be made to FIG. 3 wherein there is shown an elevational cross-sectional view of a prior art fastener as is described in U.S. Pat. No. 3,602,186. There is shown in FIG. 3 a fastener 2 having a head 3 and external threads 4. An axial bore 6 is drilled from the head of the fastener into the body. A counterbore 7 is provided for the purpose of enlarging the recess at the head end. A loosely fitting pin 8 is inserted into the bore 6 and is fastened to the bolt at the blind end 9 by means of a press fit. The head of the pin 8 terminates in a disc 11 having a face or indicator area 12 which is preferably provided with a highly visible coating of a bright color such as red-orange. A window 13 of glass, plastic or any other suitably transparent or translucent material is fixed to the visible face of the bolt head 3, preferably by being inserted flush with the surface as shown in FIG. 3 in a manner such that it rests flush against and in close contact with the indicator area 12. The free space between the pin 8 and the wall of axial bore 6 and counterbore 7 is substantially filled with a light-absorbing indicator fluid 14 of a different color from that of the indicator surface 12, for example a dense blue or black fluid.

When the indicator area 12 of FIG. 3 is in close contact with the interior surface of the window 13, the light-absorbing indicator fluid 14 is substantially displaced from between such members so that the bright color of the indicator area is visible through the window. When, however, the fastener becomes elongated due to stress placed upon it, the window 13 separates from the indicator area 12 permitting the light-absorbing indicator fluid 14 to flow between the two members. When appropriate separation has been achieved, a change in color of the indicator area from a bright to a dark appearance will become apparent to one viewing the indicator area through the window 13.

There are several shortcomings in the prior art fastener shown in FIG. 3 and in order to better appreciate the apparatus and method of this invention reference will be made to FIG. 3 still further.

Through tests and experience it was determined that the seal required to contain the light-absorbing indicator fluid 14 in the fastener as shown in FIG. 3 without leakage or deterioration was not possible with a metal-to-plastic or metal-to-glass staking operation used to fix the window 13 to the head 3. The design of the fastener of FIG. 3 simply did not lend itself to volume production for the variables of a staking operation were too great to assure the hermetically sealed condition called for in the design.

A second problem encountered in the design and production of fasteners of the type shown in FIG. 3 was that in the event where a specially designed and fabricated bolt was required it was found necessary to provide a staking ring on the top of the head of the bolt in order to hold the unit in the bolt. In doing so it was found that the control of the ring as well as the location of the ring was more critical than normally specified for heading techniques. Consequently, it was found that a special design would be required in any unusual or non-standard bolt in order to install the indicator feature.

A third problem encountered in the production of bolts of the type shown in FIG. 3 was that the ability to hold the quality and the tolerances required exceeded normal volume production techniques. Each component of the fastener, as well as the fastener itself, had to be controlled very closely during each manufacturing operation and also during assembly. The control of quality was difficult since standard gauging techniques could not be used to assure proper performance. To elaborate, the surface on which the window was to seat, as well as the interior surface of the window itself, and the contact surface of the pin (the indicator area) had to be maintained to at least 100 microinches finish, squareness, and flatness. This tolerance was not acceptable as a cumulative specification for volume production. In other words, if each of these components were within the specification but the three of them together would not meet the specification, the indicator would be undependable or inaccurate. Also, the placement of the pin with respect to the window and the machined surfaces inside the fastener had to be very closely controlled. Since each of these surfaces were referenced separately, there was no way to correct a misplacement prior to a subsequent operation. The light-absorbing indicator fluid had to be compounded for each fastener and a trial and error visual determination had to be made for each fastener.

Still further production problems were encountered during the assembly process using the design of FIG. 3. A misaligned pin, a slightly concave or convex surface on the pin or window, a poor bond of the pin and the fastener could not be determined until after total assembly. As a result of this condition, it was not possible to tell whether the unit would operate satisfactorily until the final staking operation. At this point a malfunctioning bolt would have to be scrapped in its entirety. Any in-process or subassembly rejections were practically impossible.

Further problems with the prior art fastener as shown in FIG. 3 were encountered in the automating of the assembly. The assembly of the pin to the fastener, the filling of the fastener with light-absorbing indicator fluid, the placement of the window, required considerable experience and excellent performance to meet an acceptable degree of accuracy. In this respect a paramount problem was the necessity to degas the light-absorbing indicator fluid during assembly. It was found necessary to use special vacuum equipment for this operation. Adding to the complexity of the problem was the fact that the most critical assembly operations had to be performed while the fastener was submerged in light-absorbing indicator fluid with such fluid under a vacuum control.

The apparatus and method of this invention overcome most, if not all, of the shortcomings enumerated above making it possible to produce a reliable stress indicating fastener using assembly line techniques.

DESCRIPTION OF THE PREFERRED EMBODIMENT

Figure 1:
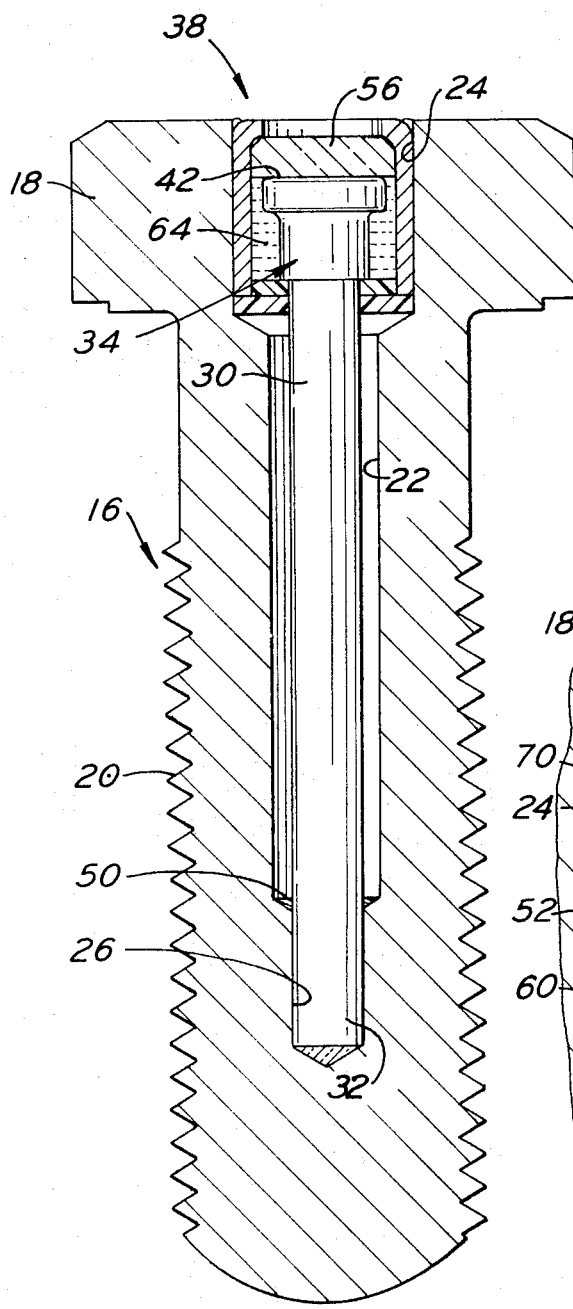
FIG. 1 is an elevational cross-sectional view of the preferred embodiment of the apparatus of this invention.

Turning now to FIG. 1, the apparatus of this invention includes a fastener 16 having a head 18 and external threads 20. Head 18 may be in any desired configuration making it possible to turn the fastener with a suitable tool such as a wrench.

An axial bore 22 is drilled from the head of the fastener a substantial distance into the fastener body. A counterbore 24 is provided at the head 18 in order to receive the indicator unit as will be described more fully hereafter. A pilot hole 26 is provided within the fastener for the purpose of receiving the pin member 30.

Pin member 30 is provided with a first end 32 adapted to be received within the pilot hole 26 and a second end 34 adapted to be received within the capsule 38.

Figure 2:
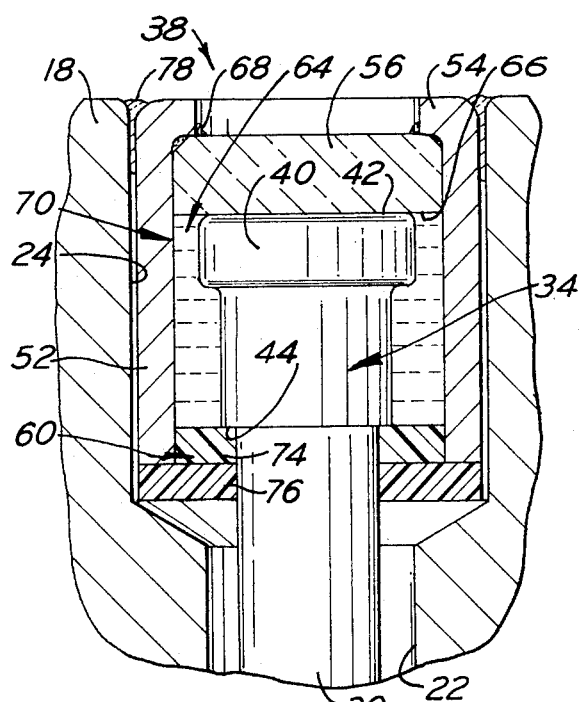
FIG. 2 is an enlarged fragmentary elevational cross-sectional view of the indicator portion of the apparatus of this invention.

As is shown more clearly in FIG. 2, the second end 34 of pin member 30 includes an enlarged head portion 40 and an indicator area 42 which is a brightly colored planar surface of the enlarged head portion disposed essentially transverse to the axis of the pin member 30. The color selected for the indicator area 42 is preferably a highly visible coating of red-orange. As will be apparent as the description proceeds, other colors may be selected depending upon particular conditions.

Adjacent the enlarged head portion 40 of the pin member 30 is a shoulder 44 the function of which will be described with reference to the sealing structure of the capsule.

The first end 32 of the pin member 30 is fastened to the wall defining the pilot hole 26 by means of an adhesive 50 which may be applied to either one or both of the surfaces of the pin member 30 and the wall of pilot hole 26 prior to assembly. Alternate structures for securing the pin member 30 to the interior wall of the fastener 16 should be considered within the spirit of this invention including, but not limited to, screw threads or a press fit.

Turning now to FIG. 2, capsule 38 is a fluid holding member defined by a ferrule member 70 having a side wall 52 and an outer wall 54. A window 56 is secured to the ferrule member. A sealing member 60 defines an inner wall of the capsule. The elements 70, 56 and 60 thus cooperate to define a fluid holding member capable of retaining light-absorbing indicator fluid 64 within the confines of such member. It will thus be observed from FIG. 2 that the entire second end 34 of the pin member 30 including the indicator area 42 is encapsulated within the fluid holding member along with light-absorbing indicator fluid 64.

Window 56, in the preferred embodiment of FIGS. 1 and 2, is manufactured from tempered glass such as Pyrex. The internal surface 66 of window 56 is essentially planar and complementary to the indicator area 42 such that in the position shown in FIG. 2 the indicator area 42 is in contact with the internal surface 66 with the result that there is essentially no light-absorbing indicator fluid 64 between these members. In the position shown in FIG. 2, therefore, the brightly colored indicator area 42 is clearly visible through the window 56 and indicates an unstressed condition of the fastener.

The window 56 is retained within the capsule 38 by means of adhesive 68 applied either to the window or to the internal surface of the essentially cylindrical ferrule member 70.

As will be evident from FIG. 2, the side wall 52, outer wall 54 and the window 56 cooperate to define a generally cup-shaped member into which is disposed the light-absorbing indicator fluid 64 and the second end 34 of pin member 30 during assembly.

Sealing of the capsule after the placement of the second end 34 and the light-absorbing indicator fluid 64 is accomplished by means of sealing member 60 which, in the preferred embodiment of FIGS. 1 and 2, is a stepped elastomeric seal received about pin member 30 and contacting the side wall 52 of the ferrule member 70. The inner portion 74 of the sealing member is in compression between the internal surface of the side wall 52 and the external surface of the pin member 30. The outer portion 76 is in contact with the bottommost surface of the ferrule member 70 as well as the external surface of the pin member 30. While in the preferred embodiment the sealing member 60 of FIG. 2 is shown as a two piece seal, a one piece configuration should be considered within the spirit of the invention. Similarly, other sealing configurations for completing the encapsulation of the indicator area and the light-absorbing indicator fluid should be considered within the spirit of this invention.

As will be evident from FIG. 2, there is a slight clearance provided between the wall of counterbore 24 and the external surface of the ferrule member 70. This clearance provides for axial and transverse movement of the indicator subassembly within the fastener during production. When positioned as shown in FIG. 2, the capsule is fastened to the wall of counterbore 24 by means of adhesive 78 applied to either one or both of the respective surfaces of the fastener and the capsule. Other fastening means should be considered within the spirit of the invention.

Once assembled in the configuration as shown in FIG. 1, the fastener is in condition for use. When it is taken up and placed in a stress condition, it will elongate causing the indicator area 42 to separate from the window 56. Light-absorbing indicator fluid 64 will thus flow between the indicator area and the window causing a change in appearance of the color of the indicator area. This change in appearance is essentially linear in proportion to the depth of film of light-absorbing indicator fluid. In the fluid is very opaque or of very high light absorbing power, a film thickness on the order of 0.001 inches is sufficient to change the appearance of the bright red-orange color of the indicator area 42 to the characteristic color of the fluid which, in the preferred embodiment, is a deep blue.

The strain at which the change of appearance effectively occurs can be well controlled by controlling the optical density or light absorbing power of the fluid. It has been found in practice that the fastener can be calibrated to show the change in color of the indicator area within ten per cent of a precalculated strain specification.

The slight elongation of the fastener during take up which produces a gap between the pin member and the window is elastic. Thus, the strain indicator is reversible and if the fastener should become loosened the bright color of the indicator area 42 will become visible thereby providing warning of the loose condition.

In the preferred embodiment the light-absorbing indicator fluid 64 is a mineral oil in which has been dissolved a die powder. Other fluid compositions should be considered within the spirit and scope of this invention.

METHOD OF ASSEMBLY

Turning now to FIGS. 4(a) – 4(l), the method of assembly of this invention will now be described.

As the description proceeds it will become obvious that the method of this invention essentially involves the production of subassemblies with a joining of these subassemblies to produce the complete fastener.

Starting with FIG. 4(a), the first step in the method of this invention is the providing of a threaded fastener 80 which, in the preferred embodiment, is a standard bolt having alloy, thread and fit characteristics specified by the customer. In machining operations on the threaded bolt subassembly a bore 22 is first drilled as shown in FIG. 4(b). Thereafter a counterbore 24 (FIG. 4(c)0 is drilled. Bore 22 should be slightly larger than the diameter of the pin member 30. Similarly, counterbore 24 should be slightly larger than the diameter of the capsule 38

After drilling the bore and counterbore the bolt subassembly is then cleaned and if required it is heat treated. Thereafter a pilot hole 26 is drilled as shown in FIG. 4(d). This completes machining of the threaded bolt subassembly.

The capsule subassembly starts with the providing of a generally cylindrical ferrule member 70 as shown in FIG. 4(e). Ferrule member 70 has a side wall 52 and a partial turned in outer wall 54. As shown in FIG. 4(f) a tempered glass window 56 having a slight amount of adhesive 68 at the circumference thereof is dropped into the ferrule member so that the window is joined to the outer wall 54. The ferrule member and window thus cooperate to define a generally cup-shaped fluid holding member.

The next step in the preparation of the capsule subassembly is the filling of the cup-shaped or fluid holding member with a light-absorbing indicator fluid 64 as shown in FIG. 4(g). The fluid fill is a premeasured amount of light-absorbing indicator fluid which substantially fills the entire fluid holding member as shown in FIG. 4(g). It is not necessary that the fluid holding member be completely filled provided some fluid will escape when the pin member is inserted into the fluid holding member. The forcing of excess fluid out of the fluid holding member is considered desirable during assembly since this reduces the likelihood of air entrainment in the fluid. Thus, the quantity of premeasured fluid placed in the fluid holding member should be calculated such that when the capsule is finally assembled all available space within the capsule will be filled with fluid.

The pin subassembly starts with the providing of a pin member 30 such as is shown in FIG. 4(h). The pin member 30 has a first end 32 and a second end 34 which includes an indicator area 42 of a bright color such as red-orange. A shoulder 44 is also provided at the second end of the pin member 30.

As shown in FIG. 4(i) the pin member 30 is provided with a stepped sealing member 60 which, as shown in FIG. 4(j), is disposed about the pin member 30 adjacent the shoulder 44.

The pin subassembly is then joined to the capsule subassembly as shown in FIG. 4(k) to form an indicator subassembly. This takes place as the second end 34 of the pin subassembly is placed in the capsule subassembly with the indicator area 42 adjacent the internal surface 66 of window 56. Thereafter the capsule is sealed as the sealing member 60 is brought into contact with the ferrule member 70 and the inner portion 74 of the sealing member is compressed between the internal wall of the ferrule member 70 and the external surface of the pin member 30. A back up seal is provided by the outer portion 76 of the sealing member.

As the second end 34 of the pin member 30 is placed in the capsule excess light-absorbing indicator fluid 64 is forced out of the capsule as was previously described. Thus the capsule is completely filled with fluid without air entrainment.

With the sealing member 60 resting against the shoulder 44 of the pin member 30 the indicator area 42 is maintained in contact with the internal surface 66 of the window 56.

The indicator subassembly as shown in FIG. 4(k) is now ready to be fastened to the threaded bolt subassembly of FIG. 4(d). Prior to this, however, quality inspection checks are made of the indicator subassembly to determine proper operation thereof. In this respect the fluid integrity of the subassembly is inspected to determine that the capsule is in fact fluid tight. Further, a visual determination is made that the indicator area 42 is in contact with the window 56 such that the characteristic color of the indicator area is clearly visible through the window. Still further, the capsule can be checked for air entrainment which serves to reduce the effectiveness of the light-absorbing indicator fluid. Finally, the pin member may be withdrawn from the capsule a slight amount to check for the color change at the window.

Final assembly of the fastener takes place as the indicator subassembly is joined to the threaded bolt subassembly as shown in FIG. 4(l). To accomplish this assembly the first end 32 of the pin member is inserted into the pilot hole 26 and is fastened to the wall defining the pilot hole by means of an adhesive 50. This adhesive may be placed on either one or both of the surfaces of the pin member and the pilot hole wall.

After the adhesive 50 has cured and the first end 32 of the pin member 30 is secured to the wall of pilot hole 26, a slight tamp is imparted to the capsule 38 in the arrow direction shown so as to move the capsule into the head 18 a degree sufficient that the indicator area 42 is disposed immediately adjacent the window 56. As was previously noted in connection with the description of FIG. 2, the slight clearance between the wall of counterbore 24 and the capsule permits axial and transverse movement of the capsule with respect to the head 18. This clearance allows for a slight amount of adjustment to be made with respect to the alignment of the window 56 and the indicator area 42 so that these two planar surfaces are very nearly parallel and in close proximity.

Once in the position as shown in FIG. 4(l) the capsule is fastened to the bolt head by means of adhesive 78 (shown more clearly in FIG. 2). Adhesive 78 may be applied to either one or both of the capsule or the counterbore wall. Alternately, the adhesive may be injected between these members after they are in position. Slight pressure such as may be provided by a spring may be exerted on the capsule until the adhesive 78 has been set up so that indicator area 42 will maintain correct alignment with and close proximity to the window 56. Once the adhesive 78 has properly cured the fastener is then finally inspected and is ready for use.

Advantages

There are numerous advantages to the fastener of this invention as well as the method of assembly thereof.

A principal advantage is that the fastener lends itself to production utilizing assembly line techniques in which subassemblies are produced and inspected and thereafter joined together. Of principal significance is the fact that the light-absorbing indicator fluid is fully encapsulated with the indicator area of the pin member at a time prior to final assembly with the threaded bolt. As an indicator subassembly as shown in FIG. 4(k), the capsule and pin member may be inspected and even tested. Rejects may either be reworked or scrapped. The threaded bolt itself is not subject to scrap upon rejection of the indicator as is the case with the prior art fastener as shown in FIG. 3.

A further advantage of the apparatus and method of this invention is that the window can be aligned with and brought into close proximity with the indicator area in the indicator subassembly. Machining tolerances for the various parts of the fastener of this invention are not so critical as the prior art fastener of FIG. 3 in which the pin must be precisely fixed within the bolt so that after the window is staked in place it will be closely adjacent the interior surface of the window.

A still further advantage of this invention is that adhesive fastening of the capsule and the pin to the bolt provide a degree of vibration dampening which thus serves to insulate the capsule and pin from the bolt.

The apparatus and method of this invention provide a balanced temperature compensation structure not found in the prior art fastener of FIG. 3. Note in the apparatus of FIG. 3 that the light-absorbing indicator fluid 14 fills the entire cavity within the fastener. In contrast the fluid of this invention is limited to the capsule. Thus, as the light-absorbing indicator fluid 64 of FIG. 1 of this invention expands due to heating, it will tend to expand inwardly against the sealing member 60. In contrast the light-absorbing indicator fluid 14 of the prior art apparatus of FIG. 3 has no area in which to expand except to exert pressure against the window 13 and the seal between the window and the bolt head 3.

The indicator subassembly of this invention can be assembled into virtually any type of strain member whether it be a bolt, rod, or other machine element. Special fasteners and elements can readily be adapted to receive the indicator subassembly of this invention.

It should be emphasized again that whereas the term strain indicator has been used throughout the description of this invention this phrase has been selected because strain in a member produces movement of the pin member which produces an apparent color change to an observer. Since strain, stress and torque are interrelated the apparatus of this invention may well be termed a stress indicator or a torque indicator. The use of the term strain indicator, thus, should not be considered as limiting the invention.

MODIFICATIONS OF THE INVENTION

Throughout the description of the invention reference has been made to a strain member and the elongation of a strain member which produces an apparent change in color in an indicator. Within the spirit of this invention should be considered compression members in which a shortening of the length of a member causes a window initially separated from an indicator area to come in contact with it producing a similar but opposite apparent change in color of the indicator to an observer. This invention, therefore, should be considered sensitive to any change in length of a member whether it be an increase in length or a decrease in length.

While in the preferred embodiment adhesive has been used to join the capsule and the pin member to the threaded fastener, other means, known to those skilled in the art, should also be considered within the spirit of the invention.

Similarly, alternate sealing structures at the capsule in order to accommodate the pin member that extends into the capsule should be considered within the spirit of this invention.

What is claimed is:

1. An optical stress-strain indicator comprising in combination:
    a first member subject to stress-strain and having a bore extending into said member from an external surface thereof;
    an elongated second member having a first end and an exposed shank portion, said elongated second member being disposed in said bore substantially concentric therewith with said first end secured to said first member at an interior portion thereof;
    a fluid holding member having a side wall portion, a window, and an indicator element disposed within said fluid holding member, said indicator element including an indicator area adjacent said window;
    light-absorbing indicator fluid in said fluid holding member;
    said fluid holding member being secured to said first member at said side wall portion and within said bore and substantially concentric therewith with said window substantially adjacent said external surface of said first member so as to be visible;
    said indicator fluid substantially filling said fluid holding member while remaining out of contact with said first member and said exposed shank portion of said elongated second member;
    means for operatively interconnecting said exposed shank portion of said elongated second member and said indicator element, whereby;
    upon application of stress to said first member with a resulting change of length of said first member, said elongated second member is caused to move axially thereby causing said indicator element to move simultaneously in the same direction with the result that said indicator area is caused to move from said window and indicator fluid is caused to flow between said indicator area and said window.

2. The invention of claim 1 in which said elongated second member is provided with a second end which is received in said fluid holding member, said second end defining said indicator element.

3. The invention of claim 2 in which said fluid holding member is defined as a capsule having at least one side wall, and outer wall including said window and an inner wall through which said elongated second member extends.

4. The invention of claim 1 in which said side wall portion is surrounded by a complementary wall of said first member whereby an axial adjustment of said fluid holding member may be made with respect to said first member prior to fastening of the members.

5. An optical stress-strain indicator comprising in combination:
    a first member subject to stress-strain and having a head and a bore extending from said head into said member;
    a pin member received within said bore substantially concentric therewith and having a first end and a second end and an exposed shank portion therebetween, said first end being secured to said first member at an interior portion thereof;
    a counterbore in said first member opening through said head and concentric with said bore;
    a fluid holding member having a side wall portion and a window;
    said fluid holding member being secured to the wall defining said counterbore at said side wall portion and substantially concentric therewith with said window substantially adjacent said head so as to be visible;
    said second end of said pin received in said fluid holding member;
    sealing means between said pin and said fluid holding member;
    a light-absorbing indicator fluid in said fluid holding member and substantially filling said fluid holding member while remaining out of contact with said first member and said exposed shank portion of said pin member;
    an indicator area at said second end of said pin disposed adjacent said window, whereby;

upon application of stress to said first member there is accomlished a change in length of said first member with the result that said pin member is caused to move axially thereby causing said second end to move simultaneously in the same direction with the consequence that said indicator area moves from said window and indicator fluid is caused to flow between said indicator area and said window.

6. The invention of claim 5 in which said first member is a threaded bolt.

7. The invention of claim 5 in which said first end of said pin is fastened to said first member by means of an adhesive.

8. The invention of claim 5 in which said fluid holding member is defined by at least one side wall, an outer wall including said window and an inner wall, said side wall being fastened to said first member.

9. The invention of claim 8 in which said inner wall is defined by a sealing member engaging said side wall and the exterior surface of said pin.

10. The invention of claim 9 in which said sealing member is a stepped seal having one portion in compression between said side wall and said pin.

11. The invention of claim 9 in which said sealing member engages a shoulder defined on said pin.

12. The invention of claim 5 in which said fluid holding member is fastened to said first member by means of an adhesive.

13. An optical stress-strain indicator comprising in combination:
- a first member subject to stress-strain and having a bore extending into said member from an external surface thereof;
- a second member disposed in said bore substantially concentric therewith and having a first end secured to said first member at an interior portion thereof and an exposed shank portion;
- a fluid holding member having a side wall portion, a window, and an indicator element disposed within said fluid holding member, said indicator element including an indicator area;
- light-absorbing indicator fluid in said fluid holding member;
- said light-absorbing indicator fluid substantially filling said fluid holding member while remaining out of contact with said first member and said exposed shank portion of said second member;
- said fluid holding member being disposed substantially within said bore and substantially concentric therewith with said window visible from the exterior of said first member;
- said side wall portion being substantially surrounded by a generally complementary wall portion of said first member there being provided means to adjust the axial position of said fluid holding member relative to said first member prior to the securing of these members together;
- means for operatively interconnecting said exposed shank portion of said second member and said indicator element;
- said fluid holding member being secured to said first member with said indicator area disposed substantially adjacent said window, whereby;
- upon application of stress to said first member there is accomplished a change in length of said first member with the result that said second member is caused to move axially thereby causing said indicator element to move simultaneously in the same direction with the result that said indicator area is caused to move from said window and indicator fluid is caused to flow between said indicator area and said window.

* * * * *